United States Patent
Den Hollander et al.

(10) Patent No.: US 9,275,299 B2
(45) Date of Patent: Mar. 1, 2016

(54) SYSTEM AND METHOD FOR IDENTIFYING IMAGE LOCATIONS SHOWING THE SAME PERSON IN DIFFERENT IMAGES

(75) Inventors: Richard Jacobus Maria Den Hollander, Delft (NL); Henri Bouma, Delft (NL); Sander Hubert Landsmeer, Delft (NL)

(73) Assignee: Nederlandse Organisatie voor toegepast-natuurwetenschappelijk onderzoek TNO, Delft (NL)

( * ) Notice: Subject to any disclaimer, the term of this patent is extended or adjusted under 35 U.S.C. 154(b) by 162 days.

(21) Appl. No.: 13/810,219

(22) PCT Filed: Jul. 25, 2011

(86) PCT No.: PCT/NL2011/050541
§ 371 (c)(1),
(2), (4) Date: Mar. 7, 2013

(87) PCT Pub. No.: WO2012/011817
PCT Pub. Date: Jan. 26, 2012

(65) Prior Publication Data
US 2013/0163819 A1    Jun. 27, 2013

(30) Foreign Application Priority Data
Jul. 23, 2010  (EP) .................................... 10170682

(51) Int. Cl.
G06K 9/00 (2006.01)
G06K 9/46 (2006.01)
G06K 9/20 (2006.01)
G06K 9/62 (2006.01)

(52) U.S. Cl.
CPC .......... *G06K 9/4652* (2013.01); *G06K 9/00369* (2013.01); *G06K 9/00771* (2013.01); *G06K 9/2081* (2013.01); *G06K 9/6212* (2013.01)

(58) Field of Classification Search
None
See application file for complete search history.

(56) References Cited

U.S. PATENT DOCUMENTS 8,089,548 B2 * 1/2012 Ogura et al. ............. 348/333.01
2005/0089223 A1 * 4/2005 Krumm ........................ 382/170
(Continued)

FOREIGN PATENT DOCUMENTS

EP    1862941 A2    12/2007
JP    2000030033 A    1/2000
(Continued)

OTHER PUBLICATIONS

Swain et al.: "Indexing Via Color Histograms". IEEE Proceedings 3rd int. cont. of computer vision. Dec. 4, 1990. pp. 390-393. XP002621730. Osaka. ISBN: 0-8186-2057-9 Retrieved from the Internet: URL:http://staff.science.uva.nlj-rein/UvAwiki/uploadsjSoccerAdds/Indexing%20via%20Colorhistograms.pdf [retrieved on Feb. 9, 2011].
(Continued)

*Primary Examiner* — Bhavesh Mehta
*Assistant Examiner* — Oneal R Mistry
(74) *Attorney, Agent, or Firm* — Banner & Witcoff, Ltd.

(57) ABSTRACT

The same person is automatically recognized in different images from his or her clothing. Color pixel values of a first and second image are captures and areas are selected for a determination whether they show the same person. First histograms of pixels area are computed, representing sums of contributions from pixels with color values in histogram bins. Each histogram bin corresponds to a combination of a range of color values and a range of heights in the areas. The ranges of color values are normalized relative to a distribution of color pixel values in areas. Furthermore, second histograms of pixels in the areas are computed, the second histograms representing sums of contributions from pixels with color values in further histogram bins. The further histogram bins are at least partly unnormalized. First and second histogram intersection scores of the first and second histograms are computed. A combined detection score is computed from the first and second histogram scores.

12 Claims, 3 Drawing Sheets

(56) References Cited

U.S. PATENT DOCUMENTS

| | | | |
|---|---|---|---|
| 2005/0200921 A1* | 9/2005 | Yuan et al. | 358/518 |
| 2006/0126941 A1* | 6/2006 | Higaki | 382/190 |
| 2008/0031493 A1* | 2/2008 | Brogren et al. | 382/103 |
| 2009/0028440 A1* | 1/2009 | Elangovan | G06K 9/6202 382/216 |
| 2009/0226093 A1* | 9/2009 | Guo et al. | 382/190 |
| 2010/0177969 A1* | 7/2010 | Huang | H04N 21/64322 382/224 |
| 2011/0188746 A1* | 8/2011 | Getsch | G06K 9/00 382/165 |

FOREIGN PATENT DOCUMENTS

| | | |
|---|---|---|
| JP | 2003030033 A | 1/2003 |
| WO | WO 2009125596 A1 * | 10/2009 |

OTHER PUBLICATIONS

International Search Report—PCT/NL2011/050541—Mailing Date: Nov. 7, 2011.

* cited by examiner

SYSTEM AND METHOD FOR IDENTIFYING IMAGE LOCATIONS SHOWING THE SAME PERSON IN DIFFERENT IMAGES

CROSS-REFERENCE TO RELATED APPLICATIONS

This application is a U.S. National Stage application under 35 U.S.C. §371 of International Application PCT/NL2011/050541 (published as WO 2012/011817 A1 ), filed Jul. 25, 2011 , which claims priority to Application EP 10170682.8 , filed Jul. 23, 2010 . Benefit of the filing date of each of these prior applications is hereby claimed. Each of these prior applications is hereby incorporated by reference in its entirety.

FIELD OF THE INVENTION

The invention relates to a system and method for identifying image locations in different images that show the same person. The system may be a closed circuit TV (CCTV) system and the method may involve use of a CCTV system, wherein image areas that show the same person in different images are identified. In other embodiments the system may be a search system for searching images in an image database.

BACKGROUND

When a CCTV system is used to monitor a crowded location, using a large number of cameras, it can be a difficult task to find the current location of an individual person in different images given that the person has been spotted in one image. For example, when a person is seen to perform a crime in a CCTV image at one time, law enforcement officers may find it difficult to find that same person in CCTV images of a crowd minutes later without taking the time to trace the person through a series of images, possibly from different cameras.

Various automated methods have been proposed in the prior art to automate identification of the same person in different images. In images of crowds the identification also involves a comparison of image features of areas in different images to select areas that potentially show the clothing of the same person. An image feature that has been proposed for this type of comparison is a color histogram of an image area that may show a person. A histogram is a set of counts of occurrences of pixel values in the area that lie in respective "bins", or ranges, in color vector space. More generally, a histogram may be a set of sums of contributions from different pixels. The idea is that such a histogram will remain substantially the same independent of changes of posture and viewing angle, so that comparison of the histogram of an image area where a person has been spotted in one image with the histogram of an image area in another image can be used to detect the person robustly.

Such a method is described in JP 2000-30033. This document proposes to compute a histogram of hue values of pixels in an image area that shows clothing of a person. The use of hue values has the advantage that the histogram is fairly robust against variations of light intensity. By avoiding the use of pixel luminosity the effect of light intensity on the histogram is removed. JP 2000-30033 proposes to select the location of the image area with clothing on the basis of the detected position of another image area that contains a face. The image area that contains a face is detected with the same type of histogram of hue values.

The use of a hue and saturation histogram is mentioned in an article by N. Gheissari et al, titled "Person Reidentification Using Spatiotemporal Appearance", published in the Proceedings of the 2006 IEEE Computer Society Conference on Computer Vision and Pattern Recognition (CVPR'06). Gheissari et al emphasize the need for invariant signatures to characterize image areas that show clothing. The color values may be normalized to compensate for lighting effects. As an alternative to the use of hue and saturation the use of correction by calibrated image-position dependent brightness transfer functions is mentioned.

However, it has been found that the reliability of person identification by these techniques has limitations.

SUMMARY

Among others, it is an object to provide for increased identification reliability in a system and method for identifying image locations in different images that show the same person.

A method according to claim 1 is provided. Herein a detection score between a first and second image area in different images is computed. The detection score is computed from first and second histogram intersections of histograms with counts of pixels in the first and second image areas. For each image area histograms using different sets of histogram bins are used.

The first histogram intersection is computed using first and second primary histograms with counts of pixels in bins in respective ranges of height in the first and second image area and normalized ranges of color values. The ranges of color values are normalized separately for the first and second image area according to the statistical distribution of color values in the relevant image area. The ranges are selected for each image area so that at least on average there are predetermined ratios between the numbers of pixels in the different ranges of color values in the image area. This may be realized for example by normalizing the color values before counting pixel values in the histogram bins based on the overall statistical distribution of color values in the image area or, equivalently, by shifting histogram boundaries before counting, or a combination of both.

For example, range boundaries between ranges of values of a color component for the first and second image area each may be shifted so that the relevant image area has equal numbers of pixels with values of that color component in different ranges. In another example the size of the ranges may be selected in proportion to the standard deviation of the values of the color component in that image area and the position of the boundaries may be shifted according to the average of the color component values in the relevant image area, to place each range at a respective predetermined distance from the average, measured in units of standard deviations.

In contrast, the second histogram intersection uses secondary histograms with histogram bins defined by means of ranges of color values that are at least partly independent of the distribution of the color values, i.e. histogram with bins that differ from those of the primary histogram. In an embodiment, the secondary histograms has bins (boundaries between pixel value ranges associated with different bins) that are the same, independent of the distribution of the color values. More generally the bins of the secondary histograms are at least partly independent of the distribution of the color values in the sense that boundaries between pixel value ranges associated with different bins, do not vary or at least do not vary in the same way as variation of pixel values due to changes of lighting condition.

Because of the normalization of the ranges of color values that are used to define the histogram bins for the primary histograms, the first histogram intersection produces a result that is substantially independent of lighting conditions. Changes in lighting conditions tend to shift the average color value and to scale the extent of the distribution of color values, but the effect of shifting and scaling is removed by the normalization.

The use of histogram bins that combine height ranges with such normalized color ranges makes it possible to compare the vertical distribution of color values in image areas that possibly show the same person in a lighting independent way. Of course, if the histogram did not have different bins for different height ranges, bin normalization that equalizes the number of pixels per bin would make a histogram meaningless. By using different bins for different height ranges better use of normalized color value ranges is made possible.

However, the normalization produces unpredictable effects when all of the clothing of a person has a homogeneous color. In that case the size of the distribution of color values is mainly determined by noise, so that the result of normalization is unpredictable.

In this case the second histogram intersection of secondary histograms with non-normalized color ranges, such as distribution independent color ranges, makes it possible to obtain a meaningful detection score. The secondary histograms may have bins with predetermined ranges of input RGB values, or linear transformations of such values, such as opponent color values. This makes it possible to detect matching image areas also for areas with homogeneous color, at least under similar lighting conditions. In addition to the normalized or non-normalized color value ranges, ranges of values of other pixel parameters, such as edge direction at the pixel, may be used to define histogram bins in the primary and/or secondary histogram. Thus for example a histogram bin may be used to count pixels that have color component values in certain normalized ranges, a height in a certain height range and an edge direction in a certain direction range. However, it has been found that histogram bins with only color component and height ranges already provide reliable results. Leaving out other parameters has the advantage that sparse population of histogram bin is more easily avoided.

The first and second histogram intersection scores are combined to form a detection score. The detection score that may be used to decide whether the image area shows the same person, or to select one or more candidate image areas for inspection by a human, for example by comparing the detection score with a threshold. Relative ranking of detection scores obtained for the first image area and respective ones of a set of second areas at different locations may be used to select a most likely matching area or most likely matching areas.

Various alternative methods may be used to form the detection score from a combination of the first and second histogram intersection scores. The detection score may be computed for example by adding contributions derived from the first and second histogram intersection scores. The contributions may be the first and second histogram intersection scores themselves. In an embodiment, the contributions may be obtained by squaring differences between the first and second histogram intersection scores and the lowest values of the first and second histogram intersection scores that have been obtained by computing the histogram intersection scores for the first image area and respective ones of a set of second areas at different locations. The differences may be normalized by dividing by the size of a range of first histogram intersection score values obtained with the set of second areas.

In an embodiment, the contributions may be normalized by taking differences between the first histogram intersection scores and the lowest values of the first histogram intersection scores that have been obtained by computing the histogram intersection scores for the first image area and respective ones of a set of second areas at different locations. The differences may be further normalized by dividing by the range of first histogram intersection score values obtained with the set of second areas. The same may be applied to the second histogram intersection scores. These normalized scores of the primary and secondary histograms may be combined by summing their squares.

Instead of squares, other monotonously increasing functions, or at least non-decreasing functions may be used. Adjustable relative weights may be applied to the contributions derived from the first and second histogram intersection scores. For example, the relative weight of the first histogram intersection score may be adjusted dependent on the spread of the distribution of color values in the image areas (e.g. the difference between the maximum and minimum), the relative weight of the first histogram intersection score being increased with increasing size of the spread.

In an embodiment the relative weight of counts for different bins in the primary and/or secondary histograms are normalized before the computation of the first histogram score. This type of histogram intersection score has the advantage that some bins may be given more importance for matching. For example when a person wears a blue shirt with some red text it may be desirable for the identification of a person to assign relatively more importance to red pixels. This may be realized by the row by row normalization. In another embodiment plane by plane normalization of sums of lowest values taken over planes of bins may be used.

The identification of image areas that show the same person may be applied in automated backward searches, using a first image area in an image for a certain time point to search for second image areas in images for earlier time points to determine where a person has come from. The identification may be used in a tracking system that is configured to display images for successive time points successively, and to add indication of the image area in the relevant image where the same person has been detected in each of the displayed images. The identification may be used in an alert system that is configured to test whether the location of the identified image areas is within a predefined protected zone and an alert signal is generated compared with location. In another embodiment the alert system may be configured to generate the alert signal by computing a property of the detected track of locations as a function of time, for example to detect a running person. The identification may be used as part of a tracking method that is configured to determine successive positions of a person for example by comparing successive images to detect candidate motion vectors and to select between candidate motion vectors based on the detection score. Tracking information may be used for other purposes than surveillance, such as customer behavior analysis. The system and method may be used to search a collection of images for images with an area that matches a "query area". The collection of images may be an image data base, or a set of web pages for example.

BRIEF DESCRIPTION OF THE DRAWING

These and other objects and advantages will become apparent from a description of exemplary embodiments using the following figures.

DETAILED DESCRIPTION OF EXEMPLARY EMBODIMENTS

Figure 1:
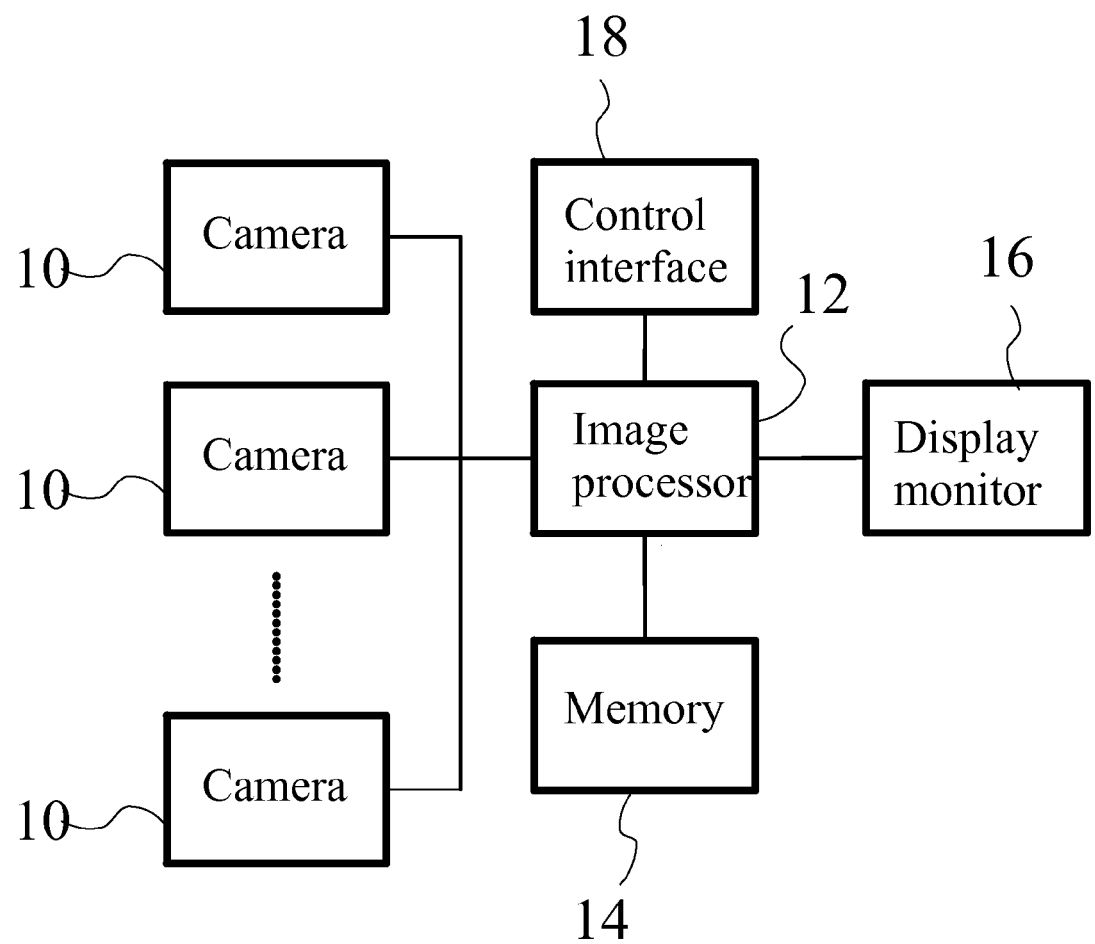
FIG. 1 shows a CCTV system

FIG. 1 shows CCTV system, comprising a plurality of cameras 10, an image processor 12, a memory 14, a display monitor 16 and a control interface 18. Image processor 12 is coupled to the plurality of cameras 10, memory 14, display monitor 16 and control interface 18. Cameras 10 are directed at different locations in a surveillance area. In an exemplary embodiment of operation, cameras 10 capture images from the surveillance area and image data to image processor 12. In this embodiment image processor 12 controls display monitor 16 to display images. A human operator (not shown) uses control interface 18 to select an image area at which a person is shown in a first captured image that is displayed on display monitor 16.

Image processor 12 searches a second captured image for corresponding image areas that show visible clothing features that match with visible clothing features in the first captured image. In response to the selection at control interface 18 by the human operator, image processor 12 indicates the image area in the second captured image that has been found to correspond to the selected image area in the first captured image. It should be appreciated that this process is given merely by way of example. For example, in other embodiments an image area may be used that is selected in a different way and/or correspondences with a plurality of image areas from the first image may be searched for and/or a combination of information obtained from image areas from a plurality of images may be used instead of the image area from the first image.

Figure 2:
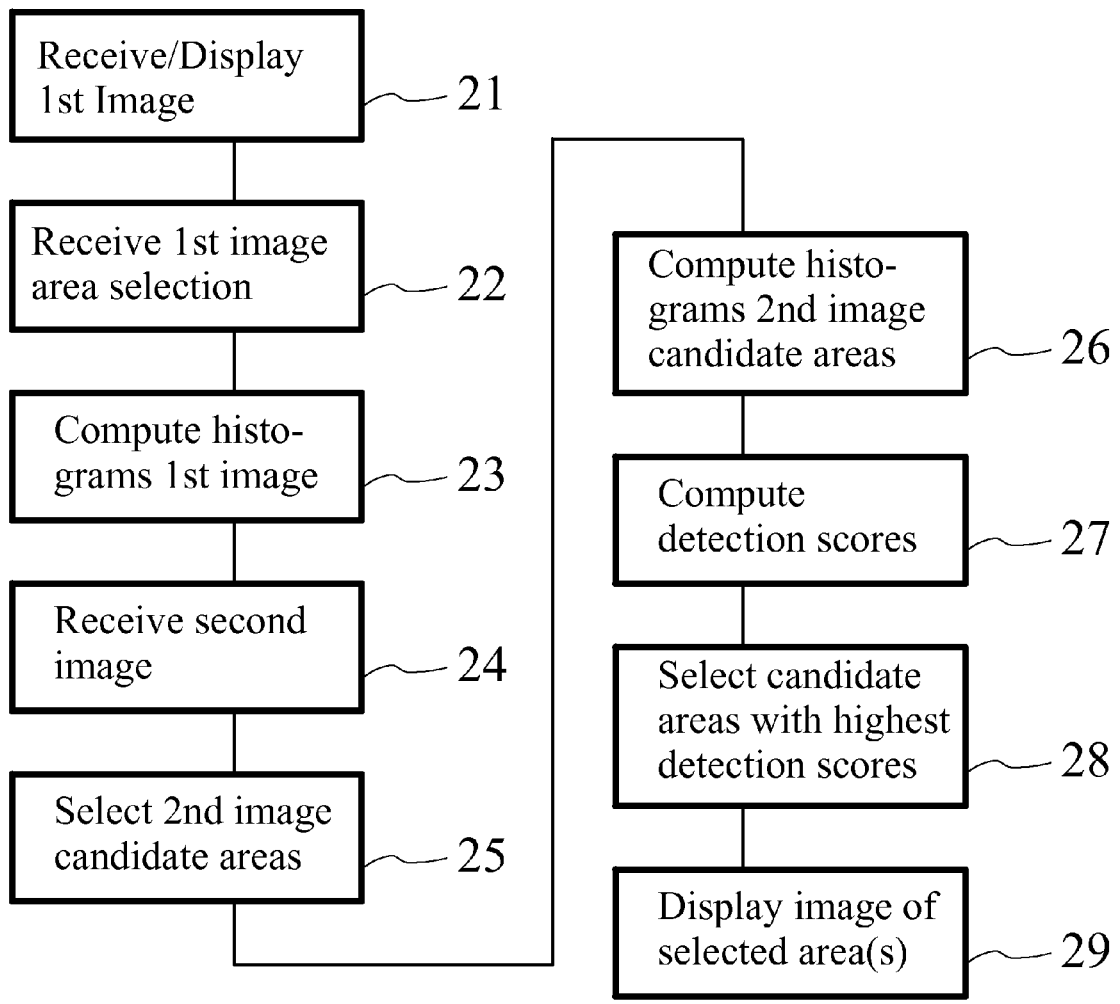
FIG. 2 shows a flow chart of a search process

FIG. 2 shows a flow chart of an exemplary search process for image areas with matching visible clothing features. In a first step 21 image processor 12 receives a first image captured at a first time point and causes the first image to be displayed at display monitor 16. In a second step 22, processor 12 receives a selection of a first image area in the first image from control interface 18. In a third step 23 image processor 12 computes a pair of histograms from pixel values from the first image in the first image and stores these histograms in memory 14. In a fourth step 24 image processor 12 receives a second image captured at a second time point. In a fifth step 25 image processor 12 selects candidate areas in the second image. In a sixth step 26 image processor 12 computes pairs of histograms, for respective ones of the candidate areas. In a seventh step 27 image processor 12 computes detection scores between the pair of histograms for the first image area from memory 14 and the pairs of histograms for the candidate image areas. In an eight step 28, image processor 12 selects one or more candidate areas with the highest detection scores among detection scores obtained with the candidate areas. In a ninth step 29 image processor 12 causes display monitor 16 to display the second image and an indication of the selected best matching candidate area or areas.

In an embodiment the areas may be vertically oriented rectangular areas with a height and width corresponding to an average height and width of persons visible at the location of the area. In another embodiment non-rectangular areas may be used, which may account for the greater width of the combination of torso and arms than the combinations legs. Only pixel values in the areas are counted. The areas may be selected in any convenient way. In an embodiment the size and/or shape of the areas may be predefined. They may depend on position in the image, corresponding for example to the distance from the camera to persons that will be visible at the location and/or the angle at which these persons may be visible. In an embodiment the areas may be selected by means of tracking from another image, by means of motion detection, by means of an image segmentation technique, or by selecting a bounding box of a detected region.

Image processor 12 may comprise a programmable processor and a program memory comprising a computer program with software modules of instructions to make the programmable processor perform the computation of the histograms, the histogram intersection scores and the detection score. Alternatively, circuit part or all of these functions may be performed by hardware modules comprising electronic circuits designed to perform these functions. For example, circuits for computing histograms and histogram scores are known per se. The modules for performing the different functions may have shared components. A centralized system may be used wherein all functions are performed by the same processor. Alternatively a distributed system may be used, wherein different functions are performed by different processors. As used herein, statements that image processor 12 is configured to perform operations mean that software modules or electronic circuits in hardware modules may be used to perform the operation and that modules for different functions may have shared components.

Figure 3:
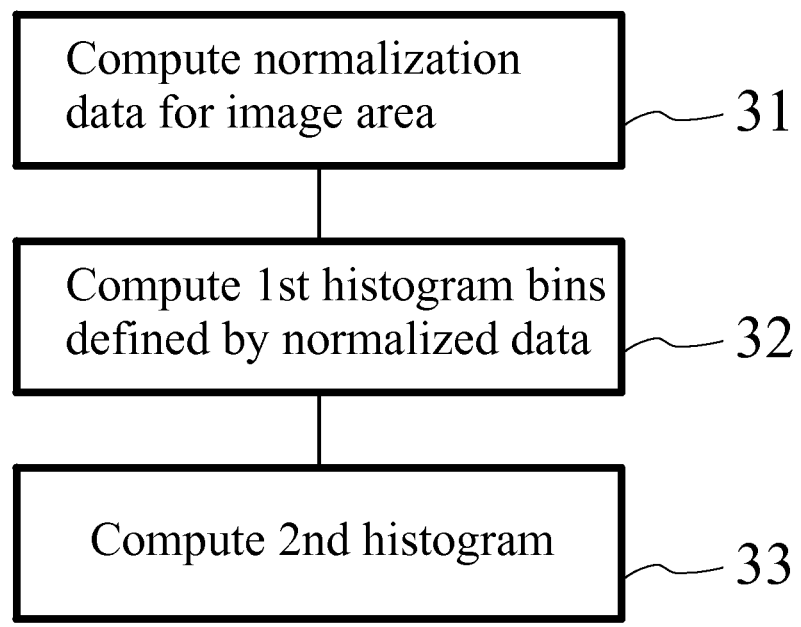
FIG. 3 shows a flow chart of a computation of histograms

FIG. 3 shows a flow chart of an exemplary computation of a pair of histograms for an image area, such as the first image area or one of the candidate areas. The image areas may be selected in any convenient way. In a first step 31, image processor 12 computes normalization data for the image area. The normalization data serve to define histogram bins that are normalized relative to the distribution of values in the image area. In an embodiment, the normalization data may be used to define a respective set of value ranges for each color component. Each histogram bin may be defined by a different combination of value ranges for different color components. The normalization data comprises sets of quantization levels for respective components of the pixel values. In this case the normalization data is selected to ensure at least on average that for each component individually there are predetermined ratios between the numbers of pixels for with component values in the respective ranges.

In an embodiment, the normalization data comprises sets of quantization levels for respective components of the pixel values, the quantization levels defining the borders between the ranges. The quantization levels for a particular component may be determined by selecting a lowest value of the particular component that exceeds the component values of a respective predetermined fraction of the pixels in the image area. Thus for each of the R, G and B components a respective set of quantization levels may be determined for example. The determination of the quantization levels for a component may involve computing auxiliary histograms of the component of pixel values in the image area and summing the counts in the auxiliary histogram for successive values of the component until respective predetermined fractions of the number of pixels in the image area are reached.

The quantization levels define a map that maps color values to ranges. This mapping may be computed by comparing color component values with the quantisation levels or by first normalizing color component values and comparing them to predetermined quantization levels. Alternatively the mapping may be represented by a look-up table with range indicators for respective values of a component value. In an embodiment, the computation of the histogram may comprise mapping each component of the pixel to an indicator of a quantization range for that component.

In a second step 32, image processor 12 computes a first histogram with bins that are defined by the normalization data from first step 31. For each pixel, the color vector of the pixel is used to determine the histogram bin to which the color vector belongs and the count for that histogram bin is incremented. For example, the count for the histogram bin may be incremented that corresponds to the combination of range indicators that result from the mapping defined by the look-up table. As used herein a histogram is a set of sums of contributions of pixels in the area to respective "bins", or ranges, in color vector space. Use of the word histogram does not imply that a graphical representation of the histogram is formed, or that the sums are stored in any predetermined arrangement. A contribution may be one or zero for example, dependent on whether the pixel value lies in the bin. In this case the sums of contributions are counts of occurrences of pixel values that lie in respective bins. The sums of contributions (e.g. counts) need not be explicit: in some embodiments, compressed representations may be used, for example when the histograms are sparse. The histogram intersection score that will be discussed in the following may be computed directly from such compressed representations.

The selection of the quantization levels provides for a normalization of the effects of lighting. However, it should be appreciated that this may be realized in different ways. Instead of using variably selected quantization levels applied to the original color component, the color components may equivalently be normalized and compared to predetermined quantization levels. This normalization may involve replacing each color component value by a count of pixels in the image area that have a lower value of the color component. Normalizing the component values and normalizing the quantization levels lead to the same results.

Although an embodiment has been shown wherein the quantization levels or the normalization of the component values is derived from counts of predetermined fractions of the pixels in the image area, it should be appreciated that other forms of selection and normalization as possible. For example, the average and standard deviation of each of the color components of the pixels in the image area may be determined. In this case the quantization levels for a color component may be offset according to the average for that component and their distance may be selected in proportion to the standard deviation for the component. Equivalently, each normalized color component of an individual pixel may be normalized by subtracting the average of that component and dividing by the standard deviation of that component.

The first histogram of normalized values may be a height-value histogram that has different sub-bins for different ranges of pixel height in the image area, i.e. for different ranges of vertical positions in the image area. Thus, each histogram sub-bin may correspond to a different combination of a range of R component values, a range of G component values, a range of B component values and a range of pixel heights at which pixels in these ranges of component values have been counted. Equivalently, respective different sub-histograms of normalized values may be computed for respective ranges of pixel height. In this case, the combination of these different sub-histograms of normalized values corresponds to a height value histogram.

In the first histogram information about the average value and spread of the color pixel values is suppressed, thus reducing dependence of the first histogram on lighting conditions. But the first histogram may suffer from problems when the pixel values in the image area all have the same value, or substantially the same value. In this case it is desirable to use information that is sensitive to the average pixel value, without foregoing the advantages of the first histogram. For this purpose a second histogram is computed for the image part, with different histogram bins that will be populated differently when the average pixel values in the image are different.

In third step 33 the second histogram is computed. The second histogram may be determined for quantized values of the components of a linear transformation of RGB space. In an embodiment opponent-color components $O1=0.7*(R-G)$, $O2=0.4*(R+G)-0.8*B$ and $O3=0.6*(R+G+B)$ may be used, each component quantized into a predetermined number of equal sized ranges. In an embodiment, third step 33 may be executed before or in parallel with the computation of the first histogram. Results of the computation of the second histogram may be used to perform the normalization of the histogram bins of the first histogram.

Image processor 12 may use the process of FIG. 3 to compute the first and second histogram as part of the pair computed in third step 23 and in sixth step 26 of FIG. 2. In addition to the color dimensions of the histogram bins, further dimensions may be added such as a gradient direction at the position of the pixel, the histograms having different bins for different gradient directions.

Seventh step 27 of the flow-chart of FIG. 2 is used to compute the detection score between the pair of histograms. This step may comprise computation of a first histogram intersection score between the first histogram of the indicated image area in the first image and the candidate area in the second image and a second histogram intersection score between the second histogram of the indicated image area in the first image and the candidate area in the second image. Preferably, the number of quantization levels is selected so that the number of pixels in the image areas is at least of the same magnitude as the number of bins in the histogram. The total number of bins is equal to the product of the numbers of ranges for the different components, i.e. a fourth power of that number if each component has the same number of ranges. For example if an area of 25×50 pixels is used (1250 pixels) about six ranges may be used per component.

A histogram intersection score between histograms may be computed as a sum over the bins of the lowest of counts in corresponding bins in the different histograms.

Sum over i of $Min(H^a(i), H^b(i))$

Here $H^a(i)$ and $H^b(i)$ are the histogram counts for a corresponding bin labelled "i" of the histograms for which the histogram intersection score is computed. "Min" is a function that selects the minimum of its arguments. If areas of different numbers of pixels are used (i.e. if the sums of the histogram counts in the separate histograms are not equal), the counts may first be adjusted in proportion to the numbers of pixels in the different areas, to compensate for the effect of the different area size.

In another embodiment this adjustment may be realized differently for different portions of the histogram. To explain a version of this embodiment it may be noted that the set of histogram bins defined by ranges for individual color components may be viewed as a multi-dimensional cube with an array of multi-dimensional sub-cubes arranged along rows in different dimensions, the histogram containing a count for each sub-cube. For example, the bins of the first histogram may be viewed as a four dimensional array with an R dimension, a G dimension, a B dimension and a height dimension.

In the other embodiment, instead of an overall sum over all bins (i) to compute the histogram intersection score, the lowest of the counts in corresponding bins for the first and second image area may first be determined. These lowest counts may be summed along a row of bins in one dimension of the histogram (e.g. the R dimension, the G dimension, the B dimension or the height dimension). The sums for different rows may then each be divided by a normalisation factor for that row. The normalization factor may be determined from the sums of the counts in the bins along the row for the separate histograms for the first and second image area, for example by taking the minimum of these sums, the maximum or the mean. The normalized sums of different rows may be added to obtain a histogram intersection score. In another embodiment plane by plane normalization of sums of lowest values taken over planes of bins may be used. In an embodiment histogram intersection scores obtained by using rows or planes in different dimensions may be averaged to obtain an overall histogram intersection score.

This type of histogram intersection score, wherein different rows or planes are given different weight, has the advantage that some bins may be given more importance for matching. For example when a person wears a blue shirt with some red text it may be desirable for the identification of a person to assign relatively more importance to red pixels. This may be realized by the row by row normalization.

In an embodiment the histograms may be smoothed before the computation of the histogram intersection score. Smoothing may be implemented as a low pass filter operation in bin space, for example by adding weighted versions of the count in a bin to the counts in adjacent bins. This has the advantage that the histogram intersection score is made more robust against noise. Other forms of smoothing include assigning different contributions from a pixel to different bins during histogram counting, dependent on the distance between the color value of the pixel to the bins and optionally also the height values. When the color value lies at the boundary between bins equal contributions may be added to those bins, and the contributions from the pixel value may become more concentrated in one bin as the distance of the color value from the boundary increases.

Although a specific example have been given wherein histogram intersection scores are computed from minima, it should be appreciated that other types of distance measures or similarity measures may be used. For example square differences between the counts in corresponding histogram bins may be computed and the square differences for all bins may be summed. An expression for a measure of probability that the histograms for the first and second image are random samples according to the same probability distribution may be used for example, subject to some regularity condition on the probability distribution. This makes it possible to use more bins in the histogram, without problems due to sparsely populated histogram bins.

The detection score may be computed by summing the first histogram intersection score computed for the first histograms and the second histograms respectively, by summing functions of these intersection scores such as squares of the intersection scores. In an embodiment the first and second histogram intersection score may be normalized before addition, to emphasize more informative histogram intersection scores. In an embodiment the normalization may be performed by dividing the first histogram intersection score value S1 by the difference (S1max−S1min) between the maximum and minimum first histogram intersection score values obtained for different candidate areas for matching with the same image area in the first image. A similar normalisation may be applied to the second histogram intersection score. The normalization may further involve subtracting the minimum histogram intersection score value before applying a function like squaring. In an embodiment squares of the result of the normalisation and subtraction are summed to obtain the detection score. In an alternative embodiment the weighted result of the normalisation and subtraction are summed to obtain the detection score.

Various alternative ways of combining the histogram intersections may be used. Instead of sums of squares, sums of other powers may be used for example. Other relative weights may be used. A power of 1.189 and weights of 0.625 and 0.375 for the first and second scores may be used for example, which has been found to provide good results. This may be approximated by using a power of 1 of the absolute values and weights of 0.65 and 0.35. A sum of combinations obtained with different powers may be used to provide for more reliable matching under a range of conditions. Preferably the weights of the first histogram intersection score relative to the second histogram intersection score is increased when the size of the range of color variation in the areas increases.

In an embodiment, the candidate image areas may be selected by tracing movement through successive images. In this case a motion vector may be estimated that applies to an image area in one image and used to compute the position of a candidate image area in another image from the position in the one image, the motion vector and optionally the time difference between capture of the images. Techniques for estimating motion vectors are known per se. They may include recursive updates of the motion vector based on matching of image areas in successive images.

In other embodiments the candidate image areas may be selected in other ways. For example, candidate image areas may be selected detecting the locations of sufficiently large deviations between a captured image and a background image wherein no person is present in the candidate area. Edge detection in a captured image may be used to select the boundaries of candidate image areas. A combination of these techniques may be used to select image areas.

Although an embodiment has been described wherein a human operator selects one image area in a first image and image processor 12 selects a matching candidate image area in a second, later image, it should be appreciated that other applications are possible. Image processor 12 may select matching candidate image areas in a plurality of images as for the second image. In another example, the second image may be captured earlier than the first image, so that the location of a selected person can be traced back. Instead of matching with an image area in the first image that has been selected by the human operator, the image processor may match with one or more image areas that the image processor automatically selects in the first image. This may be used to detect movements of persons from which crowd statistics may be derived, for example to detect dangerous situations. Also, once a human operator selects a person in an image, the detected locations of that person in other images will be immediately available in this case.

Instead of the pair of histograms based on the image content of the selected area in the first image only, a pair of histograms may be used that are accumulated from corresponding image areas in a plurality of images. In this way, sensitivity to the accidental presence or absence of visible aspects of a person the first image may be reduced.

Although examples have been shown wherein each histogram bin is defined by a combination of ranges for different components, i.e. by a block in color vector space with sub-blocks that have plane boundaries defined by the quantization levels, it should be appreciated that a different distribution of bins could be used and/or sub-blocks with more complicated shape. For example a set of bins limited to a substantially spherical subspace of component vector space may be used.

Although the histogram bins have been described in terms of ranges, it should be appreciated that instead they may be defined by means of values, such as central color-height values of the bins, contributions to the bins being determined from the distance to the central value for example. The set of central values implicitly defines ranges of values corresponding to the respective central value, each range containing values that are closer to the central value of the range than to any other central value in the set.

A predefined lookup table may be used to lookup bins based on the color vector, after normalization of the color vector in the case of the first histogram. Alternatively, a part of the color vector may be used for such a look up, another part being used to compare with quantization levels. In another embodiment a covariance matrix of the color components may be determined and a histogram of the sizes of coefficients of the decomposition of the color vector along the eigenvectors of that matrix may be used. Histograms of other rotated versions of the color vector may be used.

Although the term histogram is sometimes used to refer to a graphical representation of counts, it should be appreciated that in the present context it refers to a set of counts of pixels for different range bins, or more generally a set of sums of contributions from pixels to the bins, or a smoothed version of a set of counts or sum of contributions.

Although an example has been described wherein all pixels in an image area are used for the normalization to compute the first histogram, it should be appreciated that instead it may suffice to use only part of the pixels, for example a randomly selected part to determine the normalization.

As described the second histogram is computed using at least one pixel value component that is not normalized. Although an example has been shown wherein the second histogram is computed from three transformed color components of a pixel, it should be appreciated that fewer components may be used, for example only one component. It may be noted that in the case of a histogram with normalized bins, such as the first histograms, use of a single component would result in predetermined ratios between the counts in different bins. However, a single component does not have this effect in the second histogram, because its bins are not normalized. Hue and/or saturation may be used for example, or luminosity. The point is that the second histogram differs from the first histogram in that alternative different contents of an image area can lead to different second histograms even if they lead to the same first histogram, because the second histogram doest not use the complete normalization that is used for the first histogram and preferably none of this normalization. The second histogram should be computed in such a way that pixel value spread in this histogram is not completely removed (or reduced to mere noise) when the clothing has uniform color, in contrast with the first histogram, i.e. the second histogram should be at most partly normalized.

Although examples have been shown wherein the histogram intersection scores obtained using the first and second histograms are added to compute a detection score, it should be appreciated that other possibilities of using such combined scores are possible. For example, in an embodiment the spread of color vector values in the image areas may be used to determine the relative weight of the first and second histogram intersection scores in the detection result. The spread may be determined for example as the highest max-min differences for any color component in the first and second image areas (the max-min distance is the difference between the highest value and the lowest value of the color component in the image area), or as the highest of the standard deviations of the color component values in the first and second image areas. Instead of the max-min distance a difference between component levels that just exceed the components values of respective predetermined fractions of the pixels in the image areas may be used. The spread may be any other measure of the maximum diameter of the distribution of the non-normalized color values in color space.

The first histogram intersection score may be given relatively more weight for higher values of the spread than for lower values. In an embodiment only the first histogram intersection score is used when the spread exceeds a first threshold, or only the second histogram intersection score when the spread is below a second threshold and optionally a combination of the spreads in between the first and second threshold if these thresholds are different.

A method of identifying image areas that show a same person in different images is provided, the method comprising capturing color pixel values of a first and second image; selecting a first and second image area in the first and second image respectively; computing first histograms of pixels in the first and second area respectively, the first histograms representing sums of contributions from pixels with color values in histogram bins, each histogram bin corresponding to a combination of a range of color values and a range of heights in the first or second image area, the ranges of color values being normalized relative to a distribution of color pixel values in the first and second area respectively; computing second histograms of pixels in the first and second area respectively, the second histograms representing sums of contributions from pixels with color values in further histogram bins for ranges of color values that are at least partly independent of the distribution; computing a first histogram intersection score of the first histograms for the first and second image area; computing a second histogram intersection score of the second histograms for the first and second image area; computing a combined detection score from the first and second histogram scores.

In a further embodiment the method comprises defining respective sets of value ranges, each for a respective color component of the color pixel values, each first histogram bin corresponding to a combination of value ranges for the respective color components and a range of height, adjusting boundaries between the value ranges in each set for the first and second image area, to positions that equalize numbers of pixels in the first and second image area with color component values in the respective ranges.

In another embodiment the method comprises selecting a plurality of second image areas in the second image, computing the first and second histograms for each of the second areas and the first and second histogram intersection scores between the first and second histogram for the first area and the first and second histograms for each of the second areas, wherein the combined detection score is computed for each of the second image areas by adding contributions derived from the first and second histogram intersection scores, after normalizing the first and second histogram scores relative to each other, at least in proportion to a size of a range of values of the first histogram intersection scores obtained for different ones of the second image areas.

In another embodiment the method comprises defining respective sets of value ranges, each for a respective color component of the color pixel values, each first histogram bin corresponding to a combination of value ranges for the respective color components and a range of height, summing counts from the first histogram for histogram bins for different ranges of a first one of the color components or the height, having a same combination of remaining ranges; normalizing the counts from the first histogram for the histogram bins having said same combination of remaining ranges by dividing by the summed counts; determining the first histogram intersection score using the weighted counts. In a further embodiment the step of determining the first histogram intersection score comprises summing intermediate intersection scores obtained by normalizing counts using summed counts wherein respective different ones of the color components are used as said first one of the color components.

In another embodiment the first and/or second histograms are smoothed before computation of the histogram intersection scores.

A computer program product such as a magnetic or optical disk or a semi-conductor memory is provided, comprising a program of instructions for a programmable data processor that, when executed by the programmable data processor cause the programmable data processor to perform the steps of the any of these embodiments.

An image processing system for identifying image areas that show a same person in different images is provided, the image processing system comprising an input for receiving captured color images; a first histogram computation module configured to compute first histograms of pixels in the first and second area respectively, the first histograms representing contributions from pixels with color values in histogram bins, each histogram bin corresponding to a combination of a range of color values and a range of heights in the first or second image area, the ranges of color values being normalized relative to a distribution of color pixel values in the first and second area respectively; a second histogram computation module configured to compute second histograms of pixels in the first and second area respectively, the second histograms representing contributions from pixels with color values in further histogram bins for ranges of color values that are at least partly independent of the distribution; a first histogram intersection score computation module configured to compute first histogram intersection score of the first histograms for the first and second image area; a second histogram intersection score computation module configured to compute a second histogram intersection score of the second histograms for the first and second image area; a detection score computation module configured to compute a combined detection score from the first and second histogram scores.

In an embodiment the system comprises a plurality of color image cameras directed at different areas, with image outputs coupled to the input for receiving captured color images.

In an embodiment the first histogram computation module is configured to use respective sets of value ranges, each for a respective color component of the color pixel values, each first histogram bin corresponding to a combination of value ranges for the respective color components and a range of height, the image processing system comprising an adjustment module configured to adjust boundaries between the value ranges in each set for the first and second image area, to positions that equalize numbers of pixels in the first and second image area with color component values in the respective ranges.

In an embodiment the system comprises a selection module configured to select a plurality of second image areas in the second image, the first and second histogram computation module being configured to compute the first and second histograms for each of the second areas, the first and second histogram intersection score computation modules being configured to compute the first and second histogram intersection scores between the first and second histogram for the first area and the first and second histograms for each of the second areas, the detection score computation module being configured to compute the combined detection scores are computed for each of the second image areas by adding contributions derived from the first and second histogram intersection scores.

In an embodiment the first histogram computation module is configured to use respective sets of value ranges, each for a respective color component of the color pixel values, each first histogram bin corresponding to a combination of value ranges for the respective color components and a range of height, the histogram intersection computation module being configured to sum counts from the first histogram for histogram bins for different ranges of a first one of the color components or the height, having a same combination of remaining ranges, to normalize the counts from the first histogram for the histogram bins having said same combination of remaining ranges by dividing by the summed counts and to determining the first histogram intersection score using the weighted counts. In a further embodiment the first histogram intersection computation module is configured to sum intermediate intersection scores obtained by normalizing counts using summed counts wherein respective different ones of the color components are used as said first one of the color components.

In an embodiment the first and/or second histogram intersection computation module are configured to smooth the first and/or second histograms before computation of the histogram intersection scores.

The invention claimed is:

1. A method of identifying image areas that show a same person in different images, the method comprising
   capturing color pixel values of a first and second image;
   selecting a first and second image area in the first and second image respectively;
   computing a first and second primary histogram of pixels in the first and second area respectively, the primary histograms representing sums of contributions from pixels with color values in histogram bins, each histogram bin corresponding to a combination of a range of color values and a range of heights of the pixels in the first or second image area, the ranges of color values being normalized relative to a distribution of color pixel values in the first and second area respectively;
   computing first and second secondary histograms of pixels in the first and second area respectively, the secondary histograms representing sums of contributions from pixels with color values in further histogram bins for ranges of color values that are at least partly independent of the distribution;
   computing a first histogram intersection score of the first and second primary histograms;
   computing a second histogram intersection score of the first and secondary histograms;
   computing a combined detection score from the first and second histogram scores
   defining respective sets of value ranges, each for a respective color component of the color pixel values, each histogram bin of the primary histograms corresponding to a combination of value ranges for the respective color components and a range of height of the pixels in the first or second image area, and
   adjusting boundaries between the value ranges in each set for the first and second image area, to equalize numbers of pixels, having color component values in the respective ranges, in the first and second image area.

2. A method according to claim 1, comprising selecting a plurality of second image areas in the second image, computing the first and second histograms for each of the second areas and the first and second histogram intersection scores between the first and second histogram for the first area and the first and second histograms for each of the second areas, wherein the combined detection score is computed for each of the second image areas by adding contributions derived from the first and second histogram intersection scores, after normalizing the first and second histogram scores relative to each other, at least in proportion to a size of a range of values of the first histogram intersection scores obtained for different ones of the second image areas.

3. A method according to claim 1, comprising defining respective sets of value ranges, each for a respective color component of the color pixel values, each histogram bin of the primary histograms corresponding to a combination of value ranges for the respective color components and a range of height of the pixels in the first or second image area, summing counts from the primary histogram for histogram bins for different ranges of a first one of the color components or the height of the pixels, having a same combination of remaining ranges;

normalizing the counts from the primary histogram for the histogram bins having said same combination of remaining ranges by dividing by the summed counts;

determining the first histogram intersection score using the weighted counts.

4. A method according to claim 3, wherein the step of determining the first histogram intersection score comprises summing intermediate intersection scores obtained by normalizing counts using summed counts wherein respective different ones of the color components are used as said first one of the color components.

5. A method according to claim 1, wherein the first and/or second histograms are smoothed before computation of the histogram intersection scores.

6. A computer program product, comprising a non-transitory computer readable medium having a computer program embodied thereon, the computer program including instructions for causing a processor to perform the steps of claim 1.

7. An image processing system for identifying image areas that show a same person in different images, the image processing system comprising an input for receiving captured color images;

a first histogram computation module configured to compute first and second primary histograms of pixels in the first and second area respectively, the primary histograms representing contributions from pixels with color values in histogram bins, each histogram bin of the first and second primary histogram corresponding to a combination of a range of color values and a range of heights in the first and second image area respectively, the ranges of color values being normalized relative to a distribution of color pixel values in the first and second area respectively;

a second histogram computation module configured to compute first and second secondary histograms of pixels in the first and second area respectively, the secondary histograms representing contributions from pixels with color values in further histogram bins for ranges of color values that are at least partly independent of the distribution;

a first histogram intersection score computation module configured to compute first histogram intersection score of the first and second primary histograms;

a second histogram intersection score computation module configured to compute a second histogram intersection score of the first and second secondary histograms;

a detection score computation module configured to compute a combined detection score from the first and second histogram scores wherein the first histogram computation module is configured to use respective sets of value ranges, each for a respective color component of the color pixel values, each histogram bin of the primary histograms corresponding to a combination of value ranges for the respective color components and a range of height of the pixel in the first or second image area, the image processing system comprising an adjustment module configured to adjust boundaries between the value ranges in each set for the first and second image area, to equalize numbers of pixels, having color component values in the respective ranges, in the first and second image area.

8. An image processing system according to claim 7, comprising a plurality of color image cameras directed at different areas, with image outputs coupled to the input for receiving captured color images.

9. An image processing system according to claim 7, comprising a selection module configured to select a plurality of second image areas in the second image, the first and second histogram computation module being configured to compute the first and second histograms for each of the second areas, the first and second histogram intersection score computation modules being configured to compute the first and second histogram intersection scores between the first and second histogram for the first area and the first and second histograms for each of the second areas, the detection score computation module being configured to compute the combined detection scores are computed for each of the second image areas by adding contributions derived from the first and second histogram intersection scores.

10. An image processing system according to claim 7, wherein the first histogram computation module is configured to use respective sets of value ranges, each for a respective color component of the color pixel values, each histogram bin of the primary histograms corresponding to a combination of value ranges for the respective color components and a range of height, the histogram intersection computation module being configured to sum counts from the primary histogram for histogram bins for different ranges of a first one of the color components or the height, having a same combination of remaining ranges, to normalize the counts from the primary histogram for the histogram bins of the primary histogram having said same combination of remaining ranges by dividing by the summed counts and to determining the first histogram intersection score using the weighted counts.

11. An image processing system according to claim 10, wherein the first histogram intersection computation module is configured to sum intermediate intersection scores obtained by normalizing counts using summed counts wherein respective different ones of the color components are used as said first one of the color components.

12. An image processing system according to claim 7, wherein the first and/or second histogram intersection computation module are configured to smooth the first and/or second histograms before computation of the histogram intersection scores.

* * * * *